United States Patent
Andrews et al.

(10) Patent No.: US 10,082,317 B2
(45) Date of Patent: *Sep. 25, 2018

(54) BUILDING DESIGNS AND HEATING AND COOLING SYSTEMS

(71) Applicant: RACOOL, L.L.C., Spokane, WA (US)

(72) Inventors: Larry Andrews, Spokane, WA (US); Rob Young, Spokane, WA (US)

(73) Assignee: RACOOL, L.L.C., Spokane, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/418,436

(22) Filed: Jan. 27, 2017

(65) Prior Publication Data
US 2017/0138639 A1 May 18, 2017

Related U.S. Application Data

(63) Continuation-in-part of application No. 15/144,576, filed on May 2, 2016, which is a continuation of (Continued)

(51) Int. Cl.
*F24D 3/14* (2006.01)
*F24J 3/08* (2006.01)
(Continued)

(52) U.S. Cl.
CPC ............... *F24J 3/082* (2013.01); *E04B 5/48* (2013.01); *E04F 17/04* (2013.01); *E04F 17/08* (2013.01);
(Continued)

(58) Field of Classification Search
CPC ...... F24D 11/002; F24D 2200/11; F24J 3/081; F24J 3/145; E04B 5/48; Y02E 10/12; Y02E 10/40; Y02B 30/52
(Continued)

(56) References Cited

U.S. PATENT DOCUMENTS

| 209,342 A | 10/1878 | Hawley |
| 290,323 A | 12/1883 | Dickson |

(Continued)

FOREIGN PATENT DOCUMENTS

| CN | 20269235 | 1/2013 | |
| DE | 19606727 A1 * | 8/1997 | ............ F24D 11/002 |

(Continued)

OTHER PUBLICATIONS

W. Jiang et al., Cost-Effective Integration of Efficient Low-Lift Base-Load Cooling Equipment-Final; Dec. 2007; Pacific Northwest National Laboratory, United States.
(Continued)

*Primary Examiner* — Gregory Huson
*Assistant Examiner* — Daniel E Namay
(74) *Attorney, Agent, or Firm* — Wells St. John P.S.

(57) ABSTRACT

Building heating and/or cooling methods are provided that can include continuously distributing fluid from within conduits within a concrete floor of a building to conduits within grounds surrounding and/or supporting the building while transferring air to/from the interior of the building via a heat exchanger. Building heating/cooling systems are provided that can include: a building comprising walls and concrete floors; fluid containing conduit within the concrete floors; circulating fluid within the conduit; a least one heat exchanger operatively associated within the building and configured to transfer air to/from the building; and processing circuitry operatively coupled to fluid circulation controls and heat exchanger controls.

10 Claims, 9 Drawing Sheets

Related U.S. Application Data application No. 12/163,455, filed on Jun. 27, 2008, now Pat. No. 9,328,932.

(60) Provisional application No. 60/937,335, filed on Jun. 27, 2007.

(51) Int. Cl.

| | | |
|---|---|---|
| *F24F 5/00* | (2006.01) | |
| *E04F 17/04* | (2006.01) | |
| *E04F 17/08* | (2006.01) | |
| *E04B 5/48* | (2006.01) | |
| *F24D 11/02* | (2006.01) | |
| *F24D 12/02* | (2006.01) | |
| *F24D 3/12* | (2006.01) | |
| *F24D 11/00* | (2006.01) | |

(52) U.S. Cl.
CPC .......... *F24D 3/145* (2013.01); *F24D 11/0228* (2013.01); *F24D 11/0235* (2013.01); *F24D 12/02* (2013.01); *F24F 5/0046* (2013.01); *F24J 3/081* (2013.01); *F24D 3/12* (2013.01); *F24D 2200/08* (2013.01); *F24D 2200/11* (2013.01); *F24D 2200/12* (2013.01); *F24F 2005/0057* (2013.01); *F28F 2210/10* (2013.01); *Y02B 10/40* (2013.01); *Y02B 10/70* (2013.01); *Y02B 30/126* (2013.01); *Y02B 30/14* (2013.01); *Y02B 30/52* (2013.01); *Y02B 80/40* (2013.01); *Y02E 10/12* (2013.01); *Y02E 10/125* (2013.01)

(58) Field of Classification Search
USPC ..... 237/69, 8 R, 16, 56, 59, 70, 71, 81, 2 B; 165/57, 53, 56, 47, 48.1, 49, 50
IPC ........ F24D 3/14,3/12, 11/00; F24J 3/08; E04B 5/48
See application file for complete search history.

(56) References Cited

U.S. PATENT DOCUMENTS

| | | | |
|---|---|---|---|
| 346,362 A | | 7/1886 | Dickson |
| 360,958 A | | 4/1887 | Gaskins |
| 462,179 A | | 10/1891 | Turley et al. |
| 795,772 A | | 7/1905 | Janney |
| 1,024,788 A | | 4/1912 | Kitchen |
| 1,086,031 A | | 2/1914 | Davis |
| 1,333,870 A | | 3/1920 | Morley |
| 1,995,481 A | | 3/1935 | Myers |
| 2,240,951 A | | 5/1941 | Hamjy |
| 2,442,201 A | | 5/1948 | Elberty |
| 2,503,600 A | | 4/1950 | Tice |
| 2,512,854 A | | 6/1950 | Edgerly |
| 2,520,446 A | | 8/1950 | Thrush |
| 2,553,302 A | | 5/1951 | Cornwall |
| 2,575,478 A | | 11/1951 | Wilson |
| 2,598,841 A | | 6/1952 | Scott |
| 2,598,842 A | | 6/1952 | Scott |
| 2,641,449 A | | 6/1953 | Antony |
| 2,784,945 A | | 3/1957 | Fodor |
| 2,811,850 A | | 11/1957 | Clary |
| 3,247,895 A | | 4/1966 | Phillips |
| 3,568,924 A | | 3/1971 | Chenault |
| 3,782,132 A | | 1/1974 | Lohoff |
| 4,011,989 A | | 3/1977 | Diggs |
| 4,069,973 A | | 1/1978 | Edwards |
| 4,103,598 A | * | 8/1978 | Cooper ..................... F24F 7/04 165/53 |
| 4,176,788 A | | 12/1979 | Holman |
| 4,203,487 A | | 5/1980 | Gartner |
| 4,284,130 A | * | 8/1981 | Elias ........................ F24D 9/00 165/53 |
| 4,375,831 A | | 3/1983 | Downing |
| 4,429,735 A | | 2/1984 | Nomaguchi et al. |
| 4,558,571 A | | 12/1985 | Yoshinaga et al. |
| 4,688,626 A | * | 8/1987 | Tengesdal .............. F24F 3/1411 137/311 |
| 4,727,931 A | | 3/1988 | Berner |
| 4,754,614 A | | 7/1988 | Yuyama |
| 4,790,478 A | | 12/1988 | Sauvageau |
| 4,842,048 A | | 6/1989 | Higaki |
| 4,918,933 A | | 4/1990 | Dyer |
| 4,947,656 A | | 8/1990 | Alvisi |
| 4,955,930 A | | 9/1990 | Robinson |
| 5,002,118 A | * | 3/1991 | Olmstead .............. F24F 12/006 165/166 |
| 5,052,187 A | | 10/1991 | Robinson |
| 5,095,716 A | | 3/1992 | You |
| 5,179,998 A | | 1/1993 | Des Champs |
| 5,183,098 A | | 2/1993 | Chagnot |
| 5,203,500 A | | 4/1993 | Horne, Sr. |
| 5,261,251 A | | 11/1993 | Galiyeno |
| 5,390,660 A | | 2/1995 | Danielson |
| 5,415,155 A | | 5/1995 | Cohen et al. |
| 5,458,187 A | * | 10/1995 | Davis ................... F24F 12/001 165/165 |
| 5,461,876 A | | 10/1995 | Dressler |
| 5,503,219 A | | 4/1996 | Bortugno |
| 5,509,274 A | | 4/1996 | Lackstrom |
| 5,542,603 A | | 8/1996 | Macduff |
| 5,573,182 A | | 11/1996 | Gannaway et al. |
| 5,855,320 A | | 1/1999 | Grinbergs |
| 5,975,192 A | | 11/1999 | Moratalla et al. |
| 6,138,744 A | | 10/2000 | Coffee |
| 6,212,894 B1 | | 4/2001 | Brown et al. |
| 6,233,951 B1 | | 5/2001 | Cardill |
| 6,250,371 B1 | | 6/2001 | Amerman et al. |
| 6,328,095 B1 | | 12/2001 | Felber et al. |
| 6,345,770 B1 | | 2/2002 | Simensen |
| 6,347,748 B1 | | 2/2002 | Lyons |
| 6,484,794 B1 | | 11/2002 | Schulak et al. |
| 6,601,773 B2 | | 8/2003 | Saitoh et al. |
| 6,668,572 B1 | | 12/2003 | Seo et al. |
| 6,776,227 B2 | | 8/2004 | Beida et al. |
| 6,779,735 B1 | * | 8/2004 | Onstott ................. F24F 12/006 165/248 |
| 6,837,443 B2 | | 1/2005 | Saitoh et al. |
| 6,857,578 B2 | | 2/2005 | Alvarez et al. |
| 6,874,694 B2 | | 4/2005 | Saitoh et al. |
| 7,010,893 B2 | | 3/2006 | Bernhardt |
| 7,028,685 B1 | | 4/2006 | Krecke |
| 7,032,649 B2 | | 4/2006 | Schulak et al. |
| 7,155,922 B2 | | 1/2007 | Harmon et al. |
| 7,222,801 B2 | | 5/2007 | Meirana et al. |
| 7,234,646 B2 | | 6/2007 | Saitoh et al. |
| 7,555,897 B2 | | 7/2009 | Alekseevich et al. |
| 7,575,047 B2 | | 8/2009 | Lackinger et al. |
| 7,658,005 B2 | | 2/2010 | Sulzer |
| 9,328,932 B2 | * | 5/2016 | Andrews ............. F24D 11/0235 |
| 2001/0048031 A1 | | 12/2001 | Noro et al. |
| 2002/0060252 A1 | | 5/2002 | Neve et al. |
| 2002/0088867 A1 | | 7/2002 | Neve et al. |
| 2002/0108745 A1 | | 8/2002 | Kimura |
| 2003/0070787 A1 | * | 4/2003 | Moffitt ................. F24F 12/001 165/4 |
| 2003/0178498 A1 | | 9/2003 | Saitoh et al. |
| 2004/0050945 A1 | | 3/2004 | Bernhardt |
| 2004/0118932 A1 | * | 6/2004 | Sanchez ................ F24F 5/0096 237/2 A |
| 2004/0194909 A1 | | 10/2004 | Yang |
| 2004/0227003 A1 | | 11/2004 | Alvarez et al. |
| 2004/0256479 A1 | | 12/2004 | Meirana et al. |
| 2005/0011964 A1 | | 1/2005 | Greenlee |
| 2005/0040251 A1 | | 2/2005 | Daly |
| 2005/0121533 A1 | * | 6/2005 | Johnson ................. F24H 3/065 237/16 |
| 2005/0167080 A1 | | 8/2005 | Yoho, Sr. |
| 2005/0167516 A1 | | 8/2005 | Saitoh et al. |
| 2006/0027355 A1 | | 2/2006 | Dorin |

(56) References Cited

U.S. PATENT DOCUMENTS

| | | |
|---|---|---|
| 2006/0150965 A1* | 7/2006 | Kim .................. F24C 15/2042 |
| | | 126/299 D |
| 2006/0168961 A1 | 8/2006 | Alekseevich et al. |
| 2007/0108307 A1 | 5/2007 | Sinclaire |
| 2007/0205298 A1 | 9/2007 | Harrison et al. |
| 2007/0235179 A1 | 10/2007 | Phillips |
| 2007/0298298 A1* | 12/2007 | Ishigaki ............ H01M 8/04014 |
| | | 429/429 |
| 2008/0003940 A1* | 1/2008 | Haglid .................... F24F 3/14 |
| | | 454/228 |
| 2008/0105755 A1 | 5/2008 | Richings |
| 2008/0116289 A1 | 5/2008 | Lochtefeld |
| 2008/0142610 A1 | 6/2008 | Bastow |
| 2008/0164333 A1 | 7/2008 | Engwall et al. |
| 2008/0314552 A1 | 12/2008 | Rosenkranz et al. |
| 2008/0315152 A1 | 12/2008 | Daly |
| 2009/0001185 A1 | 1/2009 | Kroll et al. |
| 2009/0101305 A1 | 4/2009 | Clark |
| 2009/0159718 A1 | 6/2009 | Andrews et al. |
| 2010/0198414 A1 | 8/2010 | Kroll et al. |
| 2012/0052791 A1* | 3/2012 | Kurelowech ........ F24F 11/0017 |
| | | 454/329 |
| 2012/0064818 A1* | 3/2012 | Kurelowech ......... F24F 12/006 |
| | | 454/251 |

FOREIGN PATENT DOCUMENTS

| | | |
|---|---|---|
| JP | 10311558 | 11/1998 |
| WO | WO 2006/041418 | 4/2006 |

OTHER PUBLICATIONS

Leischeidt, Steven G., "Classroom Ventilation: Meeting Today's Callenges", Engineered Systems, May 2016, pp. 38-43, United States.

Miller, Chris, et al., "Assessing the Radiant Roads to School Design", Engineered Systems, May 2016, pp. 30-37, United States.

* cited by examiner

BUILDING DESIGNS AND HEATING AND COOLING SYSTEMS

CROSS REFERENCE TO RELATED APPLICATION

This application is a continuation-in-part of U.S. patent application Ser. No. 15/144,576 filed May 2, 2016, entitled "Building Designs and Heating and Cooling Systems", which is a continuation of U.S. patent application Ser. No. 12/163,455 which was filed on Jun. 27, 2008, entitled "Building Designs and Heating and Cooling Systems", now U.S. Pat. No. 9,328,932 issued on May 3, 2016,which claims priority to U.S. provisional patent application Ser. No. 60/937,335 which was filed Jun. 27, 2007, entitled "Building Designs and Heating and Cooling Systems", the entirety of each of which is incorporated by reference herein.

TECHNICAL FIELD

The present disclosure relates generally to the field of atmosphere modification systems and more specifically to the area of building heating and/or cooling systems as well as building designs.

BACKGROUND

Energy for use in heating and cooling buildings has become expensive to consume as well as environmentally difficult to generate. Whether occupants rely on gas, electric, or even solid fuel to heat and/or cool their buildings, the cost of these energy sources is not decreasing, and utilizing each of these sources has environmental impacts unique to each source. For example, electricity is manufactured utilizing coal in most cases or via hydro turbines. The burning of the coal can adversely impact the atmosphere, and the hydro turbines have been recognized to adversely impact fish populations. It would be beneficial to require less energy from these sources to maintain a building at a comfortable temperature during both cold winter months and hot summer months as well. The present disclosure provides both heating and cooling systems.

SUMMARY OF THE DISCLOSURE

Building heating and/or cooling methods are provided that can include continuously distributing fluid from within conduits within a concrete floor of a building to conduits within grounds surrounding and/or supporting the building while transferring air to/from the interior of the building via a heat exchanger.

Building heating/cooling systems are provided that can include: a building comprising walls and concrete floors; fluid containing conduit within the concrete floors; circulating fluid within the conduit; a least one heat exchanger operatively associated within the building and configured to transfer air to/from the building; and processing circuitry operatively coupled to fluid circulation controls and heat exchanger controls.

Building constructions are provided that can include at least one subfloor above grounds supporting the building, and interior conduits extending through the one subfloor and configured to convey a fluid, with exterior conduits extending through the grounds and configured to convey the fluid; and a control system operable to couple the interior and exterior conduits Building heating and/or cooling methods are provided that can include distributing fluid from within a building to grounds surrounding and/or supporting the building and returning the fluid to the building. The methods can also include after returning the fluid to the building, exposing the fluid to a subfloor of the building to regulate a temperature of the subfloor.

Heating and/or cooling systems are also provided that can include a control system operably associated with a wall of a building and coupled to both interior and exterior conduits, with the interior conduits configured to extend to within a mass of the building and the exterior conduits configured to extend to within grounds proximate the building.

BRIEF DESCRIPTION OF THE DRAWINGS

Preferred embodiments of the disclosure are described below with reference to the following accompanying drawings.

DESCRIPTION OF THE DISCLOSURE

This disclosure is submitted in furtherance of the constitutional purposes of the U.S. Patent Laws "to promote the progress of science and useful arts" (Article 1, Section 8).

The present disclosure provides building constructions and systems for controlling the interior temperature of these building constructions. The constructions and systems, according to embodiments, reduce airborne dust and mites by up to 90% air exchange by heat reclaiming units such as air to air heat exchangers, with $CO_2$ monitors, for example. According to other embodiments, there is no moisture absorption to encourage the growth of mold or smut spores; there are no chemicals to cause allergic reactions in sensitive people; there is no continuous circulation of airborne viruses such as that which causes Legionnaires Disease; and the construction and systems exceed health house guidelines of the American Lung Association. According to other embodiments, the constructions and systems within the constructions make the building envelope or construction envelope nearly soundproof and airtight. According to example implementations in museums, safe rooms, and computer rooms, there is no humidity to affect priceless or irreplaceable artifacts, valuables, or delicate electronic equipment.

According to another embodiment, constructions and systems have an over 200 year lifespan with little maintenance requirements; the system can use up to 60% less fuel than forced air heating and cooling; little to no environmental energy is required for summer cooling; and according to additional example embodiments, the systems meet all qualifications for energy aid programs (Form 70 A) and make lower mortgages possible because of the energy saving rating. According to additional example implementations, there can be zero carbon dioxide emissions through the use of cooling and around 50% less for heating than other heating and cooling systems available today with no contaminants. Once emitted from the systems, water can be used for decorative water features such as ponds and fountains or recycled for irrigation.

Figure 1A:
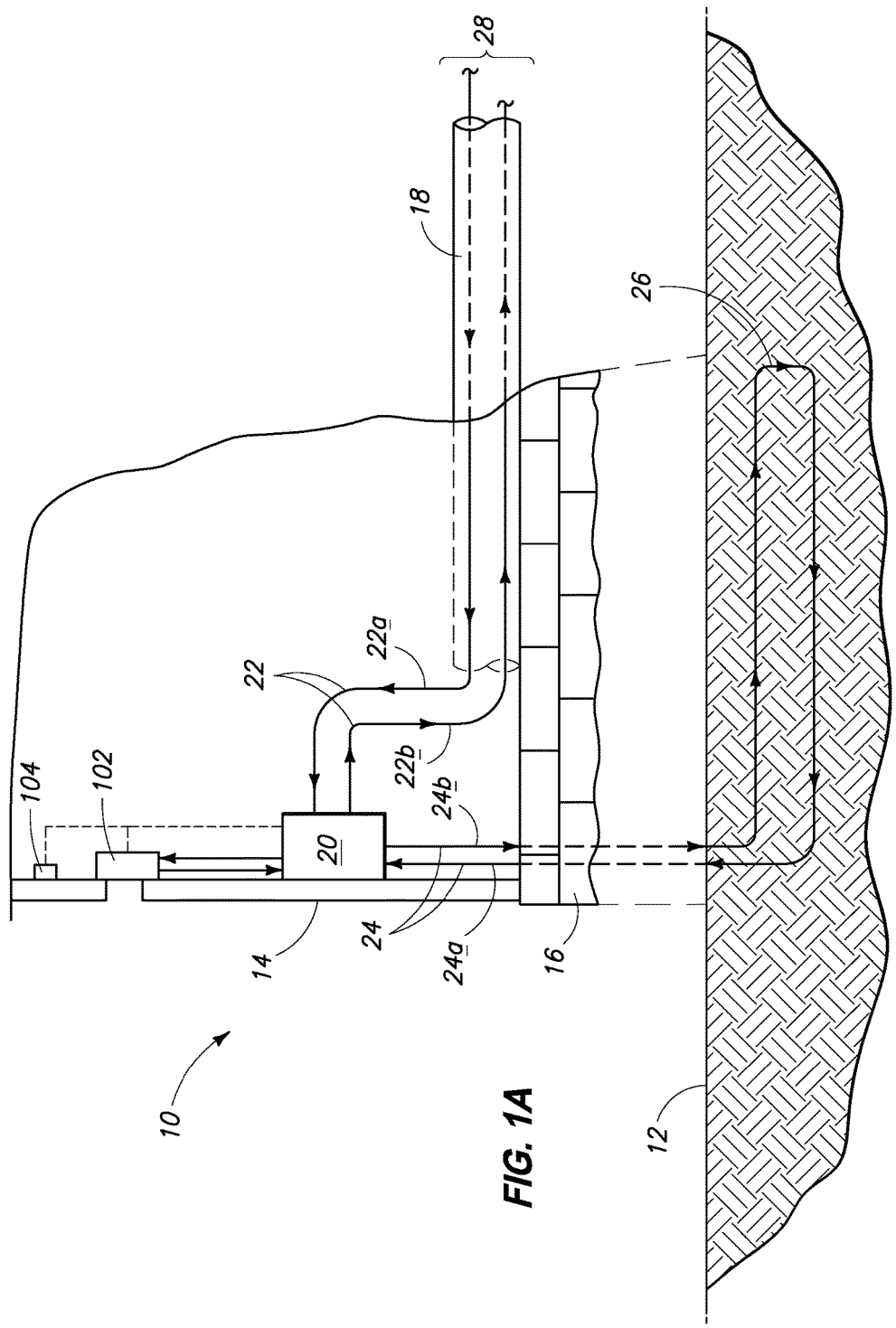
FIG. 1A is a building construction according to an embodiment of the disclosure.

The constructions and systems will be described with reference to FIGS. 1A-8. Referring to FIG. 1A, a building construction 10 is shown over grounds 12 supporting the building construction. Construction 10 includes envelope or exterior walls 14 over foundation 16. In connection with or running between, above, or as part of foundation 16 is flooring 18 which may be considered a subfloor. Envelope 14 can be any envelope and can include wood construction as well as masonry construction or even steel construction. Foundation 16 as stated above can be part of or combined with floor section 18. However, in example constructions, foundation 16 is an above-ground or perhaps even a basement construction.

Subfloor 18 can be a slab construction or a flooring construction. However, in specific embodiments, subfloor 18 is a slab construction of at least 2 inches of thickness, but can be as thick as 4 inches or greater, with 2-4 inches being preferred. Subfloor 18 can be constructed of concrete, for example. Buildings can be configured with multiple subfloors. For example, subfloors located on every level of the building and any or all of these subfloors can be constructed of concrete or other high mass building material. As another example, one subfloor can be located elevationally above another subfloor.

According to example implementations, construction 10 can include high mass areas such as floors and walls. These high mass areas can be utilized to store heat or cold that can be utilized later to heat or cool the building. For example, foundation 16 can be constructed of concrete and the concrete of the floor can be cooled throughout a hot summer evening during non-peak kilowatt hours. During the heat of the day, the high mass foundation assists in cooling the house during peak kilowatt hours. During winter months, the high mass foundation can be heated during the evening and the heat of the high mass foundation used to heat the home during peak kilowatt hours of the day.

Construction 10 also includes a control system 20 that is coupled to interior lines (conduits) 22 and exterior lines (conduits) 24. Control system 20 can be operable to couple these interior and exterior conduits. Interior lines 22 and exterior lines 24 both have respective return and outgoing lines. For example, interior lines 22 include a return line 22 A and an outgoing line 22 B. Exterior lines 24 include a return line 24 A and an outgoing line 24 B. Control system 20 controls the return and the outgoing flows of these lines.

The lines themselves are conduits. The conduits are configured to provide a fluid, typically a liquid fluid, within the sub floor portion 18 and returning through control system 20, and then to exterior, preferably within the grounds 12 via outgoing lines 24. According to example implementations, the interior conduits can extend through the one subfloor and be configured to convey fluid. The interior conduits can also be at least partially encased in concrete of a subfloor. According to other implementations, a majority of the interior conduits can be encased in the concrete of the subfloor. Where multiple subfloors are utilized the interior conduits can extend through one, a number of, or all of the subfloors.

The fluid itself that is contained within these lines is preferably water but can also be other fluids, including glycols, for example. Where water is utilized, the fluid can be treated with a disinfectant or not treated with a disinfectant.

The exterior conduits can extend through the grounds and can be configured to convey the fluid between and/or through the control unit and/or interior conduits. Substantially all or a majority of the exterior conduits can be encased in the grounds surrounding and/or supporting the building. In accordance with example implementations the building can be a commercial building and the exterior conduits can extend through the grounds supporting a parking lot associated with the commercial building. In accordance with other implementations, the building can be a multi-family unit with individual units of the building sharing common walls and/or grounds. The exterior conduits can traverse the common wall and/or grounds, for example.

In accordance with the systems, heating/cooling can include distributing fluid from within a building to grounds surrounding and/or supporting the building and returning the fluid to the building. After returning the fluid to the building, the fluid can be exposed to a subfloor of the building to regulate a temperature of the subfloor.

Control system 20 can be configured to seasonally control the flow of fluid from within conduits 22 and 24 based on temperature requirements within building construction 10. For example, during winter months, fluid can be provided from within floor construction 18 through control system 20 and out to ground loop 26. This flow can continue on a year-long basis and as such provides an ambient temperature that is more consistent with the temperature of the ground region below the home or in the surrounding grounds of the home. For example, in the winter months, while the exterior of the home may be in the 40° Fahrenheit or lower range, the interior slab portion will be more proximately in the subterranean range of 50° F. to 60° F., a significant increase in temperature of 10° F. to 20° F.; as such, when this fluid is provided from ground loop 26 to within slab 18, this warmer fluid can warm the house to at least a 10° F. to 15° F. change, thus requiring less of an interior heat source to heat the home. In the summer months, likewise the slab can be cooled to approximately 50° F. to 60° F. while the exterior of the home is in the 80° F. to 90° F. range. As such, there is a significant change, approximately 20° F. to 30° F. between the floor 18 temperature within the home and that temperature outside the home, at the same time requiring less energy to cool the home. According to example implementations, fluid, such as water, can be provided from either or both of the interior or exterior conduits to a sprinkler system associated with the grounds surrounding and/or supporting the building.

In accordance with example embodiments, perimeter 14 or envelope 14 can have walls that are insulated to at least R24 or higher. Perimeter 14 can also have less than 30% window area with a U rating of 0.333 or less. According to an example embodiment, floor 18 can also have at least 2" of insulation to an R10 rating. Above floors there can also be an R5 rating. Perimeter 14 can include a ceiling insulated to R50 or higher, for example.

The building can also have attic/ceiling fans. The fans can be configured to remove hot air from the building during summer months and maintain warmer air in the building during winter months, for example.

The building heating/cooling system 10 can also include at least one heat exchanger 102 that is operatively engaged with control system 20 as well as additional controls 104. In accordance with example implementations heat exchanger 102 can be an air to air heat exchanger and/or a liquid to air heat exchanger. With the liquid to air heat exchanger, the liquid can be associated with the liquid that circulates through the concrete. In this configuration, air can be exchanged between the outside of the building and the inside of the building over a coil containing liquid that may include the liquid circulating in the concrete, a separate liquid, or a gas, such as a refrigerant for example.

Figure 1B:
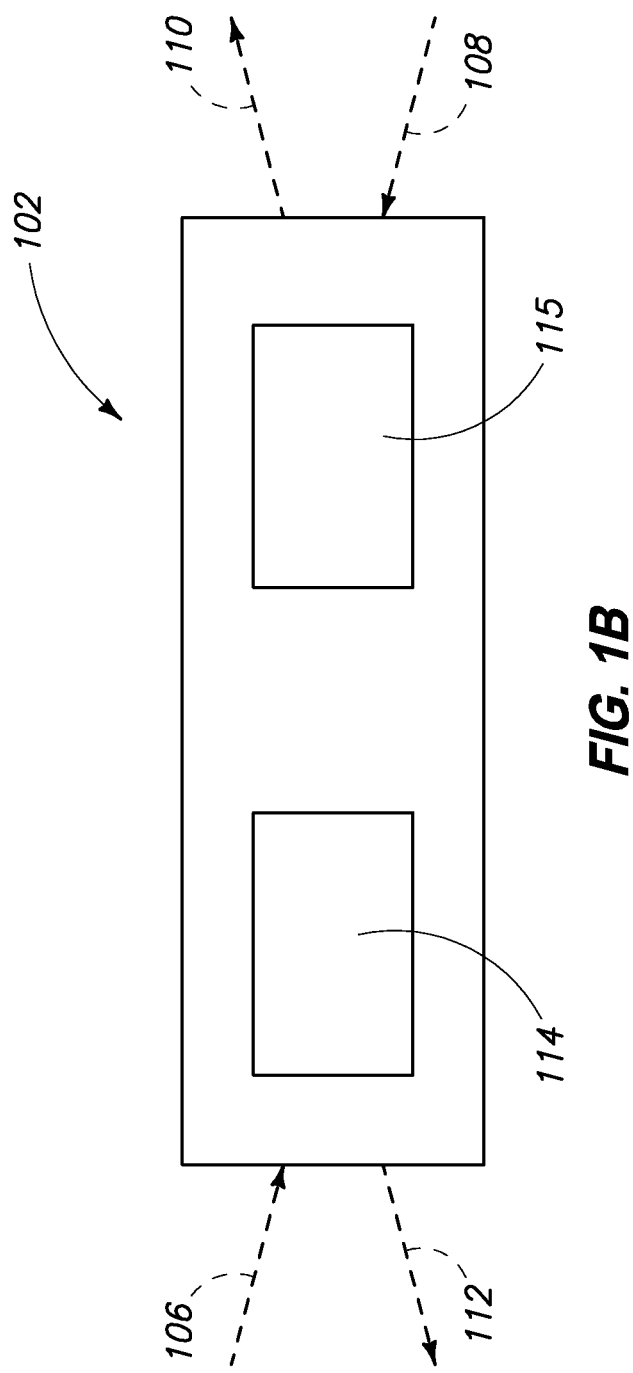
FIG. 1B is a heat exchanger according to an embodiment of the disclosure.

In the air to air configuration, FIG. 1B depicts an example embodiment of at least one heat exchanger 102 that includes intakes 106 and 108, as well as outlets 110 and 112. Air from each of the outlets can pass over cores 114 and 115 respectively that are thermally conductive material such as aluminum for example. This transfer can be facilitated with at least two motorized fans and both air paths can proceed through filters.

The heat exchangers can include drain pans to facilitate the collection of moisture through loss of water from exchanged air. Heat exchanger 102 can be operatively associated with building ducting and/or associated with an opening in the building envelope.

In accordance with example implementations, heat exchanger 102 can be used in concert with the building temperature control using the circulating fluid in the concrete to reduce humidity in the building and/or exchange high $CO_2$ air with fresh air with minimal temperature change inside the building.

Figure 2:
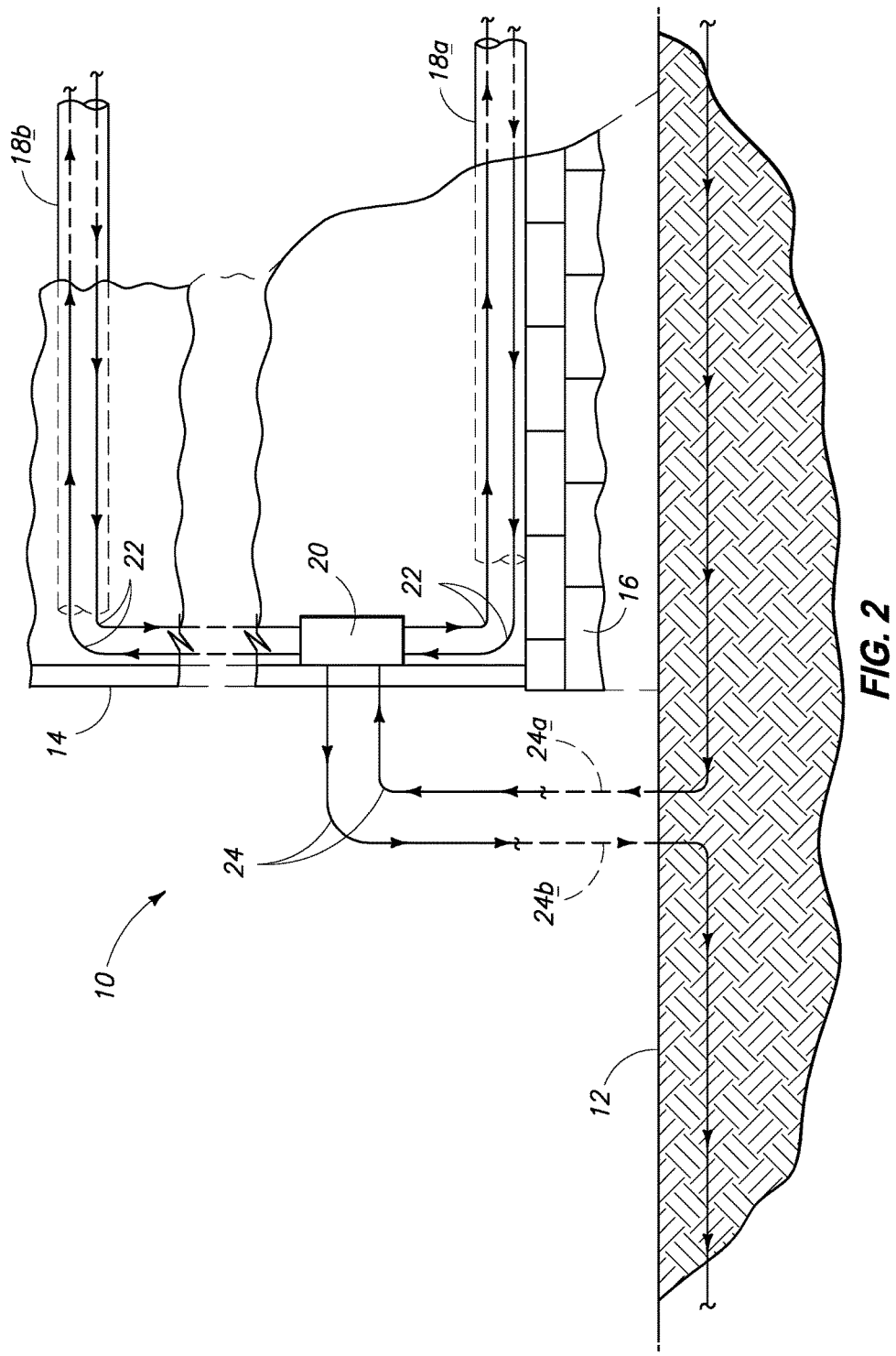
FIG. 2 is a building construction according to another embodiment of the disclosure.

Turning now to FIG. 2, another exemplary embodiment of construction 10 is shown. As the example depiction of FIG. 2 indicates, construction 10 can have at least two floors, 18A and 18B. Floors 18A and 18B can have conduits 22 extending therethrough. As depicted, conduits 22 can extend from control system 20 to floor 18A as well as floor 18B, thereby circulating fluid from intake of 24A throughout the flooring of construction 10. According to an example implementation, control system 20 may be able to regulate the flow of fluid within conduits 22 to floor 18B as opposed to 18A depending on the temperature requirements of the home. For example, in the summer months, more of the fluid received from 24A can be provided to the upper floors of construction 10 rather than the lower floors, for example, 18B and 18A. As also shown in FIG. 2, conduits 24B and 24A extend in opposing directions within ground 12. This, for example, is an indication that conduits 24A and 24B do not necessarily need to extend directly below construction 10. These conduits can extend laterally from construction 10 to subsurface regions beyond subsurface 10.

Figure 3:
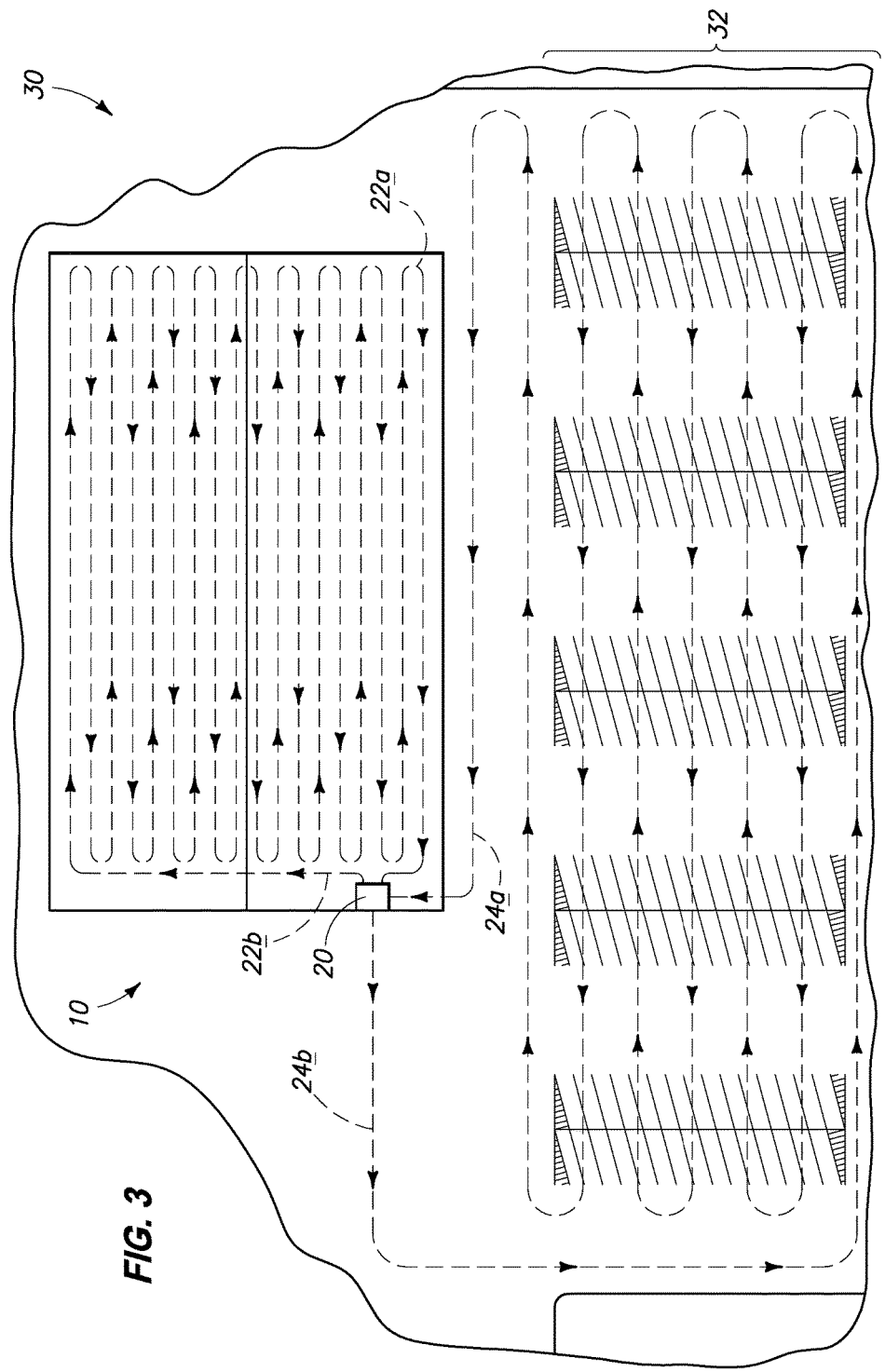
FIG. 3 is an overview of a building construction in the context of a plot plan according to an embodiment of the disclosure.

Referring to FIG. 3, an exemplary plot plan 30 is shown that includes a building 10 situated on a plot having, for example, parking designations 32 proximate thereto. As depicted, building 10 can have a control system 20 therein with conduits 22 extending therein. The conduits 22 can extend to slab or floor constructions not shown at many levels of building 10, or to only single levels of building 10, depending on design choice. Conduits 24 can extend from control system 20 and to within the ground below parking designations 32. According to example implementations, providing fluid to this mass of conduits underneath parking designation 32 can allow for the cooling and/or warming of building 10.

Figure 4:
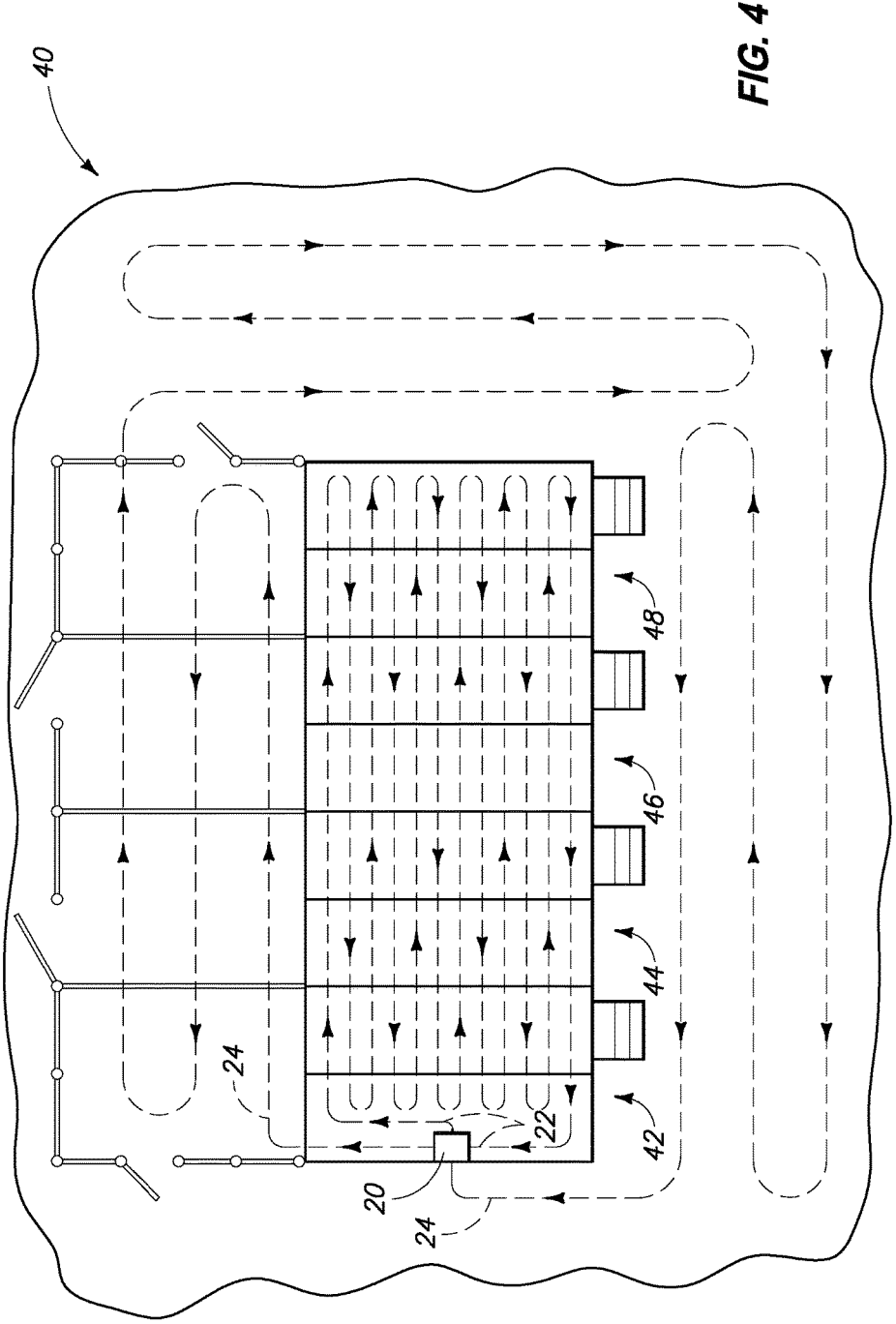
FIG. 4 is a building construction in context of a plot plan according to another embodiment of the disclosure.

Referring to FIG. 4 according to another implementation, plot 40 is shown having multiple buildings 42, 44, 46, and 48 placed thereon. These multiple buildings can have individual system controls or can have a single system control as shown, for example. Conduits 22 and 24 can be configured to take advantage of the space in and around these individual units. According to an exemplary implementation, conduits 22 can extend throughout and actually join individual units 42, 44, 46 and 48. As an example, this kind of uniform ambient heating can be utilized to lower the energy costs of each of these units rather than requiring each of the units to have individual system controls. According to exemplary implementations, individual system controls can be utilized; however, additional ground coils 24 would be required. As shown in plot 40, ground coils 24 can extend through the front and around the perimeter of buildings 42, 44, 46 and 48.

Figure 5:
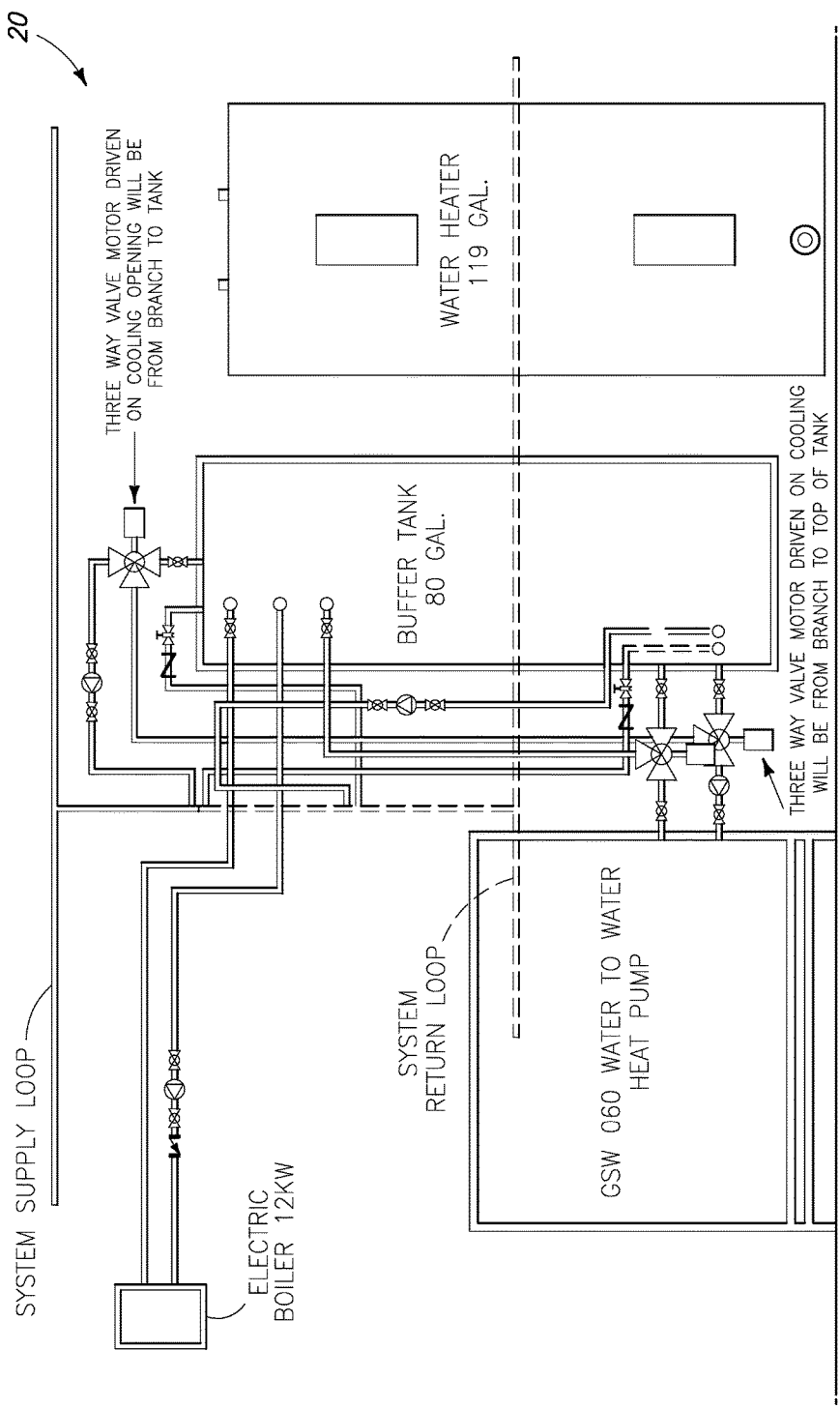
FIG. 5 is a system for use by building construction according to an embodiment of the disclosure.

Referring to FIG. 5, an example system 20 is shown. As shown in FIG. 5, system 20 has the various portions of system 20 labeled as example designations. By no means should these example designations be inferred to limit the configuration of system 20 to the systems as shown. Other implementations of the control of fluids throughout the interior of construction 10 as well as throughout the ground portions underneath and surrounding construction 10 can be utilized. As an example, system 20 may have a system supply loop that is coupled into a 3-way control valve motor driven on cooling; opening will be from the branch to the tank; a 119 gallon water heater tank can be hooked to this system as well as an 80 gallon buffer tank. As an example, water is utilized with system 20, and this fluid can be circulated using a water to water heat pump. To increase the temperature of the fluid, in this example water, as it returns through to heat the house in the winter months, for example, a 12 KW electric boiler can be utilized.

Figure 6:
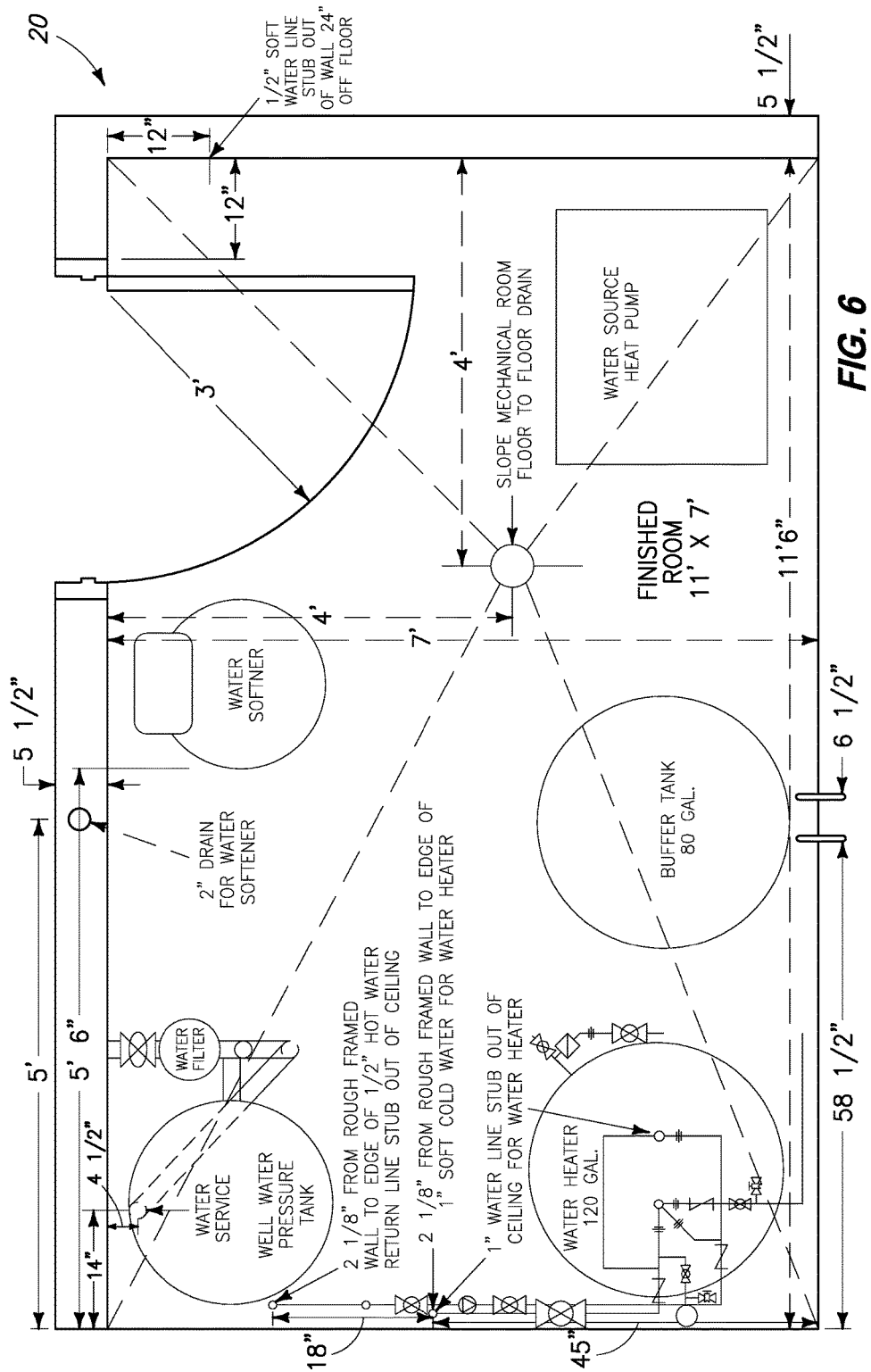
FIG. 6 is another view of the system of FIG. 5 according to an embodiment of the disclosure.

Referring to FIG. 6, system 20 is outlined as configured in an exemplary control room. The control room as stated above can include a water softener as well as, if desired, water service, water heater, buffer tank, and heat source heat pump as described previously. This can also be referred to as the mechanical room.

Figure 7:
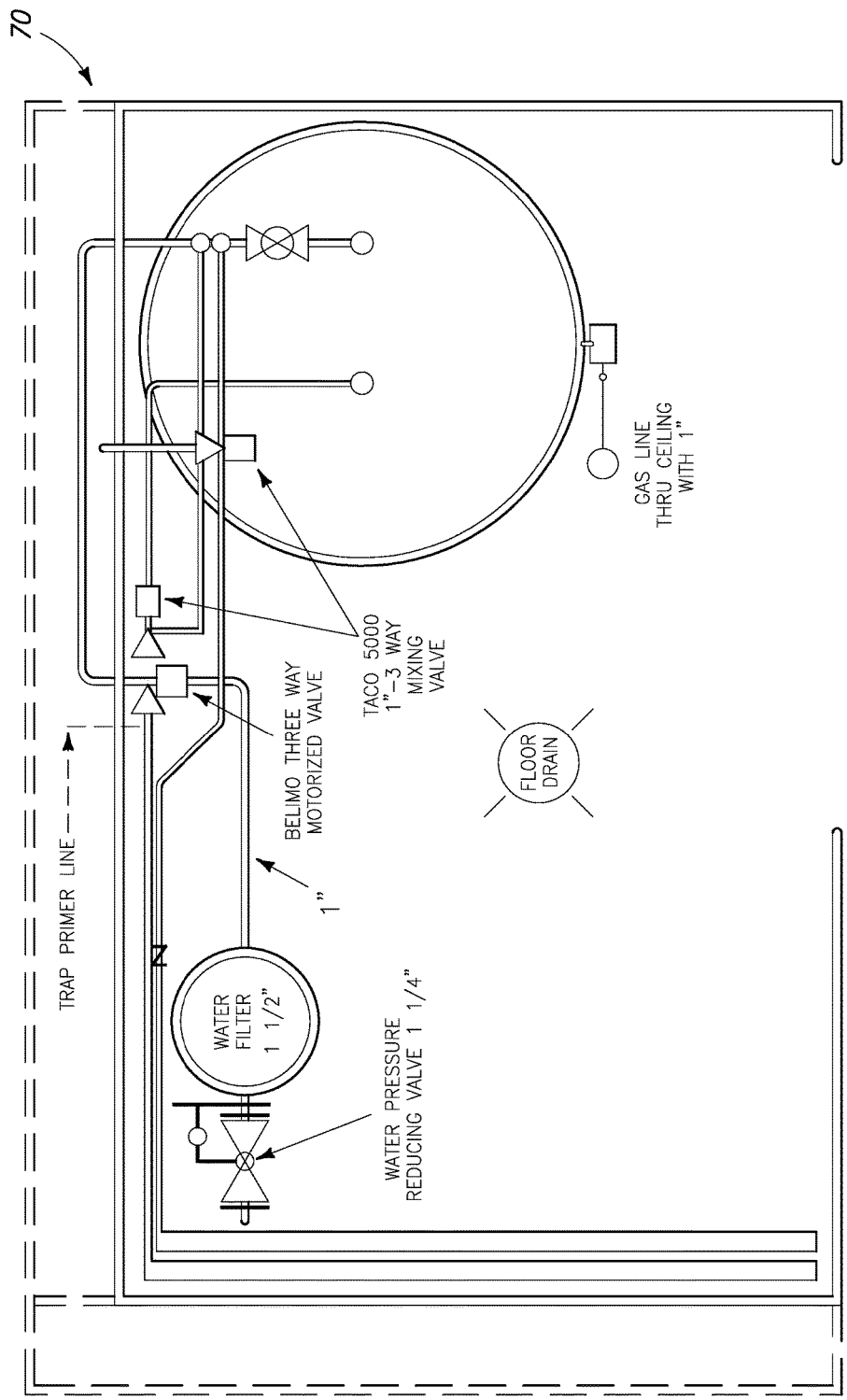
FIG. 7 is a system for use in a building construction according to an embodiment of the disclosure.
Figure 8:
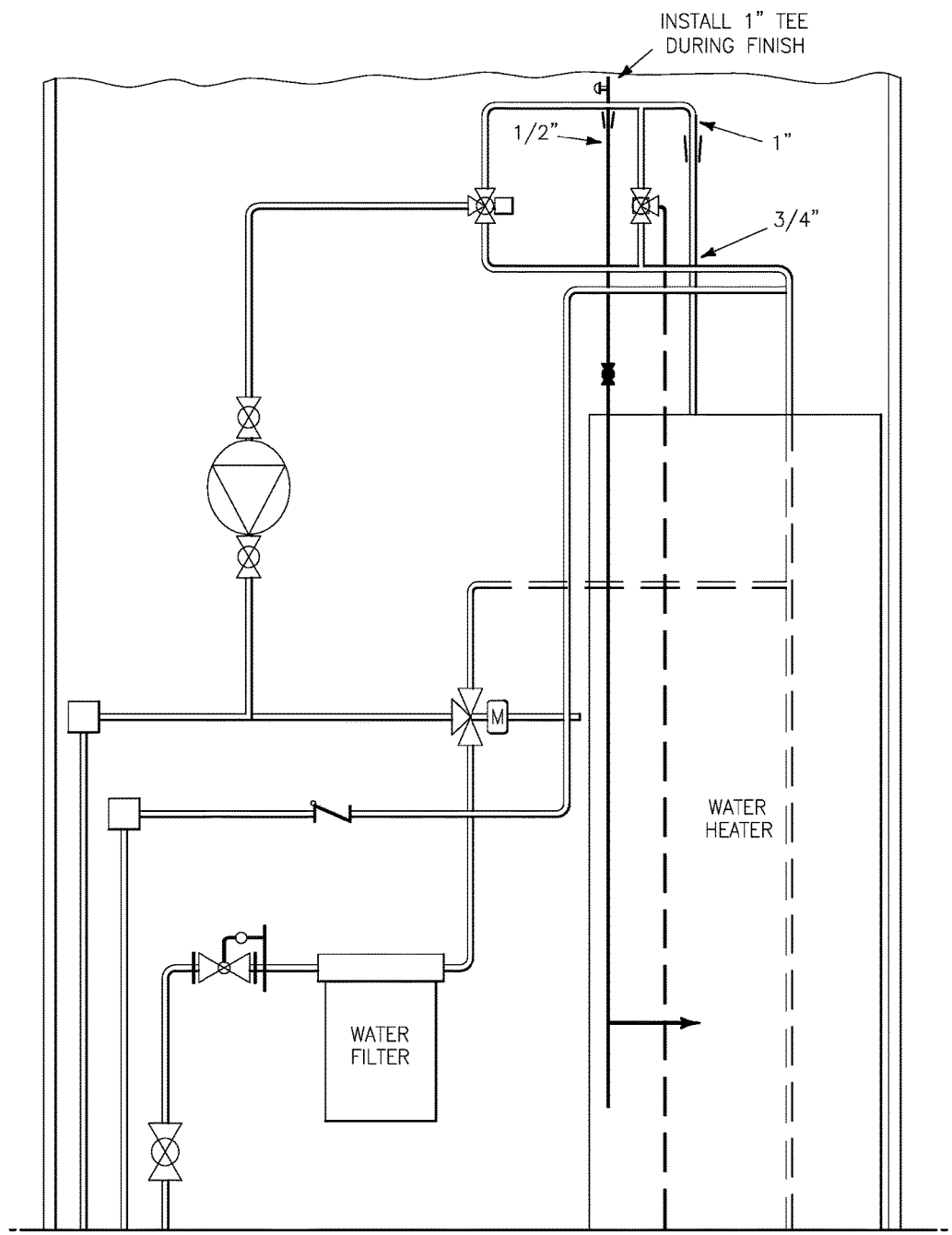
FIG. 8 is another view of the system of FIG. 7 according to an embodiment of the disclosure.

Referring to FIG. 7, an additional exemplary implementation of control system 20 is given as control system 70. As shown, control system 70 can have a water heater and a water filter coupled to one another, a water pressure reducing valve for incoming water, and this can be utilized to heat or control the incoming fluid from the ground lines. Likewise, another view of system 70 is given in FIG. 8 as a landscaped view of the system as it is configured within a control room. According to exemplary implementations, the fluid within lines 24 and 22 of the present disclosure can be utilized to provide an ambient temperature within construction 10. At specified points within a seasonal use of this system, water may be preferred, as the water can be drained from the system and replaced quite easily. The tubing itself utilized can be of copper, steel, Rehau, or other cross-linked construction.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

What is claimed is:

1. A building heating and/or cooling method comprising:
providing a building having at least one concrete floor in the building, the concrete floor having conduits extending through the floor and water within the conduits, the conduits having a continuous diameter in one cross section;
continuously distributing the water from within conduits within a concrete floor of a building directly to a pump and then directly to the grounds surrounding and/or supporting the building at a constant flow rate, the grounds having conduits extending through the grounds;
continuously and without reduction at said constant flow rate, returning the water directly to the conduits of the floor, the returning the water cooling the concrete floor and the building; and
exchanging air between the interior and exterior of the building via a heat exchanger.

2. The method of claim 1 wherein the building is a commercial building and the grounds are a parking lot proximate the commercial building.

3. The method of claim 1 wherein the method further comprises periodically distributing the water via a sprinkler system.

4. The method of claim 1 wherein the building is a multifamily housing unit.

5. The method of claim 4 wherein the water is distributed to grounds surrounding the unit and exposed to the concrete floors of individual units within the housing unit.

6. The method of claim 4 wherein at least some of the units have associated grounds and share a common wall.

7. The method of claim 1 wherein the conduits are 1" in diameter.

8. The method of claim 1 wherein the conduit is tubing constructed of copper, steel, Rehau, and/or other cross-linked construction.

9. The method of claim 1 wherein the concrete floor is a minimum of 2" thickness.

10. The method of claim 1 further comprising utilizing a plurality of directional and/or check valves to control the direction of flow of the fluid within the conduits.

* * * * *